(12) United States Patent
Cleenewerck et al.

(10) Patent No.: US 8,182,857 B2
(45) Date of Patent: May 22, 2012

(54) EDIBLE PRODUCTS WITH LOW CONTENT OF SATURATED AND TRANS UNSATURATED FATS

(75) Inventors: Bernard Cleenewerck, Knokke-Heist (BE); Toshio Ushioda, Kalzuka (JP); Sabrina Verbeeck, Meerdonk (BE)

(73) Assignee: Fuji Oil Company, Limited, Osaka (JP)

( * ) Notice: Subject to any disclaimer, the term of this patent is extended or adjusted under 35 U.S.C. 154(b) by 755 days.

(21) Appl. No.: 12/278,516

(22) PCT Filed: Feb. 8, 2007

(86) PCT No.: PCT/EP2007/051223
§ 371 (c)(1),
(2), (4) Date: Nov. 10, 2008

(87) PCT Pub. No.: WO2007/090869
PCT Pub. Date: Aug. 16, 2007

(65) Prior Publication Data
US 2009/0092713 A1 Apr. 9, 2009

(30) Foreign Application Priority Data

Feb. 8, 2006 (EP) .................................. 06101421
Nov. 21, 2006 (WO) ................. PCT/EP2006/068709

(51) Int. Cl.
*A23D 9/00* (2006.01)
*A23D 7/00* (2006.01)
(52) U.S. Cl. ........ 426/601; 426/602; 426/606; 426/607; 426/613
(58) Field of Classification Search .................. 426/601, 426/602, 606, 607, 613
See application file for complete search history.

(56) References Cited

U.S. PATENT DOCUMENTS

| 4,247,471 A | | 1/1981 | Klein et al. | |
|---|---|---|---|---|
| 4,702,928 A | * | 10/1987 | Wieske et al. | 426/607 |
| 4,839,192 A | * | 6/1989 | Sagi et al. | 426/607 |
| 4,910,037 A | * | 3/1990 | Sagi et al. | 426/601 |
| 5,061,506 A | * | 10/1991 | Leach | 426/602 |
| 5,431,948 A | * | 7/1995 | Cain et al. | 426/607 |
| 5,554,408 A | * | 9/1996 | Cain et al. | 426/607 |
| 5,731,027 A | * | 3/1998 | Cain et al. | 426/607 |
| 5,786,019 A | * | 7/1998 | Cain et al. | 426/607 |
| 5,858,427 A | * | 1/1999 | Cain et al. | 426/101 |
| 5,879,735 A | * | 3/1999 | Cain et al. | 426/603 |
| 5,912,042 A | * | 6/1999 | Cain et al. | 426/607 |
| 6,475,548 B2 | * | 11/2002 | Bons et al. | 426/603 |
| 6,777,018 B2 | * | 8/2004 | Floeter et al. | 426/603 |
| 7,108,888 B2 | * | 9/2006 | Floeter | 426/603 |
| 7,309,508 B2 | * | 12/2007 | Bach et al. | 426/607 |
| 7,700,146 B2 | * | 4/2010 | Cleenewerck | 426/607 |
| 2009/0068318 A1 | * | 3/2009 | Cleenewerck et al. | 426/93 |
| 2009/0123633 A1 | * | 5/2009 | Cleenewerck et al. | 426/607 |

FOREIGN PATENT DOCUMENTS

| EP | 0321227 | * | 12/1988 |
|---|---|---|---|
| EP | 0 687 142 B1 | | 12/1995 |
| EP | 0 731 645 B1 | | 9/1996 |
| EP | 1 419 699 B1 | | 5/2004 |
| EP | 1 491 097 A1 | | 12/2004 |
| WO | WO 97/28695 | | 8/1997 |

OTHER PUBLICATIONS

Lin, S. W. 1999. Proceedings of the 1999 PORIM International Palm Oil Congress. Palm Oil Research Institute, Kuala Lumpur, Malaysia, p. 82-93.*
Swern, D. 1980. Baileys Industrial Oil and Fat Products, vol. 1, 4th edition. John Wiley & Sons, New York, p. 415, 417.*
Paquot, C. 1987. IUPAC Method 2.150. Standard Methods for the Analysis of Oils, Fats and Derivatives. 7th edition. Blackwell Scientific Publications, Boston, Mass. p. 59-70.*

* cited by examiner

*Primary Examiner* — Carolyn Paden
(74) *Attorney, Agent, or Firm* — Scully, Scott, Murphy & Presser, P.C.

(57) ABSTRACT

The present invention relates to a structured, fat continuous edible product, wherein the edible product contains, expressed on total product basis, less than 35 wt. % of saturated fatty acids, between 20 and 100 wt. % of a triglyceride composition, between 0 and 80 wt. % of a filler material and less than 15 wt. % of water. The triglyceride composition contains less than 50 wt. % of saturated fatty acids, less than 10 wt. % of trans unsaturated fatty acids, at least 10 wt. % of POP triglycerides, wherein P is a palmitic fatty acid, O is oleic acid, a ratio SUS/SUU of at least 1.3, a ratio SUS/S3 of at least 15, at least 90 wt. % of C8-18 fatty acids, a ratio C16/C18 saturated fatty acids of at least 1. The triglyceride composition has an SFC at 20° C. of between 3 and 55%. The present invention also relates to a process for producing such a product and to triglyceride compositions suitable for use in such a product.

93 Claims, No Drawings

EDIBLE PRODUCTS WITH LOW CONTENT OF SATURATED AND TRANS UNSATURATED FATS

The present invention relates to a structured, fat continuous edible product according to the preamble of the first claim. The present invention also relates to triglyceride compositions suitable for use in such an edible product and to processes for producing such an edible product.

BACKGROUND OF THE INVENTION

Fat has found numerous applications in a wide variety of food products not only because of its nutritional importance, but also because of its wide range of functional properties and its suitability for combining with a wide variety of dry ingredients, often powdery ingredients. In such applications, the fat part is usually added to a homogeneous mass of the dry ingredients in the liquid state or under shortenised form. The fat may also be combined with water and some dry ingredients. When emulsifying the fat with the water a homogeneous product is obtained.

The structure of a product depends both on its recipe—i.e. the amount and nature of the fat and the other ingredients present in the product—and the process used to produce the product. Processing steps such as emulsification, heating, tempering, influence the structure of the product. Fat is incorporated because of its functional properties, in particular its effect on the structure of the final food product. An example of a food product where the nature of the fat has a prominent effect on the structure is chocolate: its hard structure is due to the presence of cocoa butter which is a hard fat. Confectionery creams like medium hard sandwich creams contain a medium hard fat; spreads for example chocolate spreads contain high amounts of liquid oil giving the typical soft and spreadable end product. In these examples the fat phase is combined with at least one powdery ingredient (for example sugar, milk powder, cocoa powder, etc.). Depending on the nature and the envisaged structure of the intended product, a fat with a specific Solid Fat Content (SFC) as a function of temperature will be selected. Typical SFC-profiles for different applications are illustrated in EP-A-739.589 table 22a. The SFC-profile mainly depends on the nature of the fatty acids making up the (tri)glycerides of the fat, on the triglyceride composition and on the method used to solidify the fat—in particular the crystallisation time and temperature, whether the product has been subjected to tempering or not, etc. Whether a fat is liquid or solid at a certain temperature is not only determined by the chain length of the fatty acids, but in particular by the type of fatty acid, i.e. whether it is saturated or non-saturated, and in case of non-saturated fatty acids by the type of isomer, whether it is cis or trans. Products requiring a rather firm structure, will usually contain a fat with a rather high SFC-profile which will contain a quite high amount of saturated fatty acids and/or trans isomers of non-saturated fatty acids.

Saturated fatty acids (SAFA) are abundantly present in natural fats like cocoa butter, palm oil, palmkernel oil, coconut oil, tallow, etc. Trans fatty acids (TFA) of natural origin are mainly found in ruminant fats. Natural vegetable oils and fats do not contain this trans isomer. Although TFA are unsaturated fatty acids, their structure and melting profile is much closer to that of the corresponding saturated fatty acid than to that of their cis-form.

At present, a wide range of hard structural fats which are suitable for producing structured products is naturally available. However, there is still a need for fat compositions which have a solid structure and which are predominantly based on fatty acids with a C14 to C20 hydrocarbon chain. Hydrogenation of liquid oils like soy, rapeseed, sunflower, groundnut oil, also called "hardening" has been widely used as a technique to obtain hard fats. Hardening involves conversion of unsaturated fatty acids into saturated fatty acids (SAFA), as well as conversion of cis-unsaturated fatty acids into trans-isomers (TFA), both of which contribute in converting the liquid oil into a hard fat upon hydrogenation. Although for functional reasons to obtain the desired structure incorporation of fats with higher amounts of SAFA and/or TFA will be recommended, for nutritional reasons consumption of these fatty acids is to be limited as they increases the risk to the occurrence of cardiovascular diseases. Therefore official instances, like WHO, have issued maximum recommended levels of daily intake of SAFA and TFA. Studies on the consumption patterns of fats in food like the "Transfair study" indicate that in several countries the daily intake of both SAFA and TFA is too high.

There is thus a need for triglyceride containing food systems, structured food products and structured edible products with a limited SAFA and/or TFA content, which nevertheless show the desired hard or semi-hard structure that is appropriate for the intended application. There is also a need for triglyceride compositions which enable producing edible products with a sufficiently hard structure on the one hand and a limited level of SAFA and/or TFA on the other hand. There is also a need to a process for producing such compositions.

PRIOR ART DESCRIPTION

EP-A-719.090 discloses fats for use in spreads or margarine which contain less than 35 wt. % of saturated fatty acids, 5-45 wt. % S2U, 0-60 wt. % SU2, 5-95 wt. % U3 and 0-8 wt. % S3. The diglyceride content is kept below 5 wt. % as it is believed that the presence of diglycerides in margarine fats has a negative impact on the crystallization behavior. The fats disclosed in EP-A-719.090 are characterized by a flat SFC-profile which is typical for margarines, expressed as (N5-N20) being less than 10, N5 and N20 being the SFC at respectively 5 and 20° C. The structuring properties provided by this fat composition are mainly attributed to the presence of 1.5-4 wt. % of behenic acid. Water in oil emulsions containing these fats show a good hardness. The spread is produced by mixing the fat, water and some of the other ingredients and additives and pasteurizing the composition at 85° C., followed by a cooling and crystallization process.

EP-A-875.152 relates to lamination fats with improved lamination and structuring properties, in particular a good hardness and a low saturated fatty acid content. According to EP-A-875.152 this is achieved by the presence of a minimum amount triglycerides containing long chain fatty acids, in particular by the presence of a minimum amount of arachidic and behenic acid. The fat blend further comprises 70-85 wt. % of a liquid oil and at least 15 wt. % of (H2M+H3) triglycerides, and has a saturated fatty acid content of less than 50 wt. %, a N35<35 and an N20 of 15-40 wt. %. H designates saturated fatty acids with at least 16 carbon atoms, M designates saturated fatty acids with 6-14 C atoms. The blend is characterised by a certain minimum Stevens hardness so that it suitable for use in puff pastry. The Stevens hardness of the fat blend, which is the hardness measured at 20° C. with a Stevens Texture Analyzer using a cylindrical probe of 4.4 mm diameter, is at least 150 g, preferably between 150 and 800 g. The SAFA-content of the fat blends disclosed in the examples ranges from 29 to 35.2%, the solid fat content at 35° C. ranges from 10.6 to 23.3%.

EP-A-687.142 discloses bakery fats with a saturated fatty acid content of less than 40 wt. %, a trans fatty acid content of less than 5 wt. %, a N20 of at least 10%, a S2U content of 5-50 wt. %, a (U2S+U3) content of at least 35 wt. % and a S3 content of 0-37 wt. %. It is explained that the properties of the baked products are at least similar to those of products having a higher saturated fatty acid content. To achieve this, the dough fat contains a fat component A which is rich in SUS-triglycerides and preferably contains 5-30 wt. % of behenic acid. From the examples it can be seen that preparation of the dough is done by blending the molten fat components, followed by cooling the melt and cool storage overnight, so as to obtain a plasticised fat which is suitable for mixing with the remaining dry ingredients of the dough and water.

EP-A-731.645 discloses blends of a sugar and a triglyceride component, which are suitable for use in filling fats and ice cream coatings and have a SAFA content which is lower than usual, i.e. below 45 wt. %. The triglyceride component comprises at least 40 wt. % of SU2 and 3-50 wt. % of S2U, it is free of TFA and has an N20 of at least 35 and an N30 of less than 10. It is explained that the triglyceride component contains at least 10 wt. % of behenic acid, less than 25 wt. % of StUSt (U=Unsaturated Fatty Acid; St=C18-0) and that the presence of 0.1 to 10 wt. % of trisaturated triglycerides, especially from palm oil stearin gives better structuring properties. Regardless of their limited SAFA-content, the blends display a good product performance, meaning an acceptable texture, a sufficiently high hardness and good oral melting characteristics. The fillings and coatings are prepared by mixing the ingredients, roll-refining and conching, followed by a cooling process (called "tempering") to below 20° C., preferably below 15° C. During the cooling process a working amount of fat seeds, e.g. cocoa butter seeds may be added. In the examples it is explained that after cooling and storing of the fillings at low temperature for longer periods (e.g. 16 hrs. at 7° C. followed by 1 week at 13° C. or 18 hrs at 13° C. in case a seeding agent was used), an acceptable hardness was found. Example 4 discloses a filling fat with a Stevens' hardness at 20° C. of 158 g, the filling contained 50 wt. % of fat, the fat contained 41.7 wt. % of SAFA.

From EP-A-1.543.728 a fatty thickening composition is known, which is suitable for thickening a fat based composition. The thickening composition contains between 15 and 45 wt. % of at least one hydrogenated fat and between 85 and 55 wt. % of at least one liquid oil. The hydrogenated fat is preferably a fully hydrogenated fat with at least 15 wt. % of fatty acids with more than 18 carbon atoms, preferably maximum 22 carbon atoms. The preferred hydrogenated fat is hydrogenated high erucic acid rapeseed oil. According to example 1, cooling of a blend of 25 parts fully hydrogenated high erucic acid rapeseed oil with 75 parts of rapeseed oil gives a solid final product.

All of the above-mentioned patent publications address the problem of providing a structuring fat composition which is low in SAFA, shows an acceptable hardness and is suitable for use in a final product. However, each time this problem is solved by the use of a fat component which contains behenic and/or arachidic acid, i.e. long hydrocarbon chain fatty acids as the structuring agent. Behenic acid is mostly obtained using hydrogenation. Triglycerides containing one or more of these fatty acids risk to create a waxy mouth feel upon eating, caused by their high melting point, as can be seen by their high solid fat content at 35° C. To avoid the presence of high melting triglycerides, containing more than one of these long chain fatty acids, chemical or enzymatic interesterification is often applied, followed by fractionation. However, this is a complicated and expensive production method. On top of that, sources of behenic and arachidic acid are quite expensive, as their availability is quite limited.

WO 2006/136536 describes a granular composition suitable for the production of structured products. WO 2006/136536 does however not teach how a fat with a solid structure can be obtained, with high POP and low SAFA-content, as appears from comparative example 7C in table 5.

OBJECT OF THE INVENTION

There is thus a need for a structured fat continuous edible product, which contains triglycerides, which contains a limited content of saturated and/or trans fatty acids and has a hardness that is sufficiently high and appropriate for the intended application. There is also a need to triglyceride compositions showing these properties, which are suitable for use in this edible product and to a process for producing such edible products.

It is therefore an object of the present invention to provide such a structured, fat continuous edible product at a more reasonable cost than hitherto available, which product in addition has an acceptable texture, a good mouthfeel and a good nutritional profile. In particular it is an object of this invention to provide such an edible product with a harder structure than could be expected on the basis of the triglyceride composition present in the edible product of this invention, in particular on the basis of the saturated and trans fatty acid content.

It is a further object of this invention to provide a process for the production of such a structured, fat continuous edible product, showing a sufficient hardness, at a concentration of saturated and trans fatty acids that is significantly smaller than can be expected from the teaching of the prior art.

It is also an object of this invention to provide triglyceride compositions for use in this edible product, at a reasonable cost.

DESCRIPTION OF THE INVENTION

This object is achieved according to the present invention, with a structured, fat continuous edible product showing the technical features of the characterizing part of the first claim.

Thereto, the edible product contains, expressed on total product basis,
a) less than 35 wt. % of saturated fatty acids,
b) between 20 and 100 wt. % of a triglyceride composition
c) between 0 and 80 wt % of a filler material
d) less than 15 wt. % of water wherein the triglyceride composition contains with respect to the weight of the triglyceride composition
e) less than 50 wt. % of saturated fatty acids,
f) less than 10 wt. % of trans unsaturated fatty acids
g) at least 10 wt. % of POP triglycerides, wherein P is palmitic fatty acid, O is oleic acid,
h) a ratio SUS/SUU of at least 1.3, wherein S means saturated fatty acids having 16-18 carbon atoms and U means unsaturated fatty acids having 18 carbon atoms or more
i) a ratio SUS/S3 of at least 15, wherein S means saturated fatty acids having 16-18 carbon atoms and U means unsaturated fatty acids having 18 carbon atoms or more
j) at least 90 wt. % of C8-18 fatty acids,
a) a ratio C16/C18 saturated fatty acids of at least 1,
wherein the triglyceride composition has an SFC at 20° C. of between 3 and 55%.

In the above filler material means a non-glyceride edible solid material, preferably present in powdery form.

An edible product showing these technical features has been found to take a solid structure, even if only a small part of the triglyceride component is in a crystallized form. By leaving the edible product of this invention some time at rest after having been produced, a stabilization of the crystallized fat has been observed and an increasing hardness of the edible product. The inventors have found that the edible product of the present invention is characterised by a texture that is harder than could be expected from the saturated fatty acid content of the product, and harder than the traditionally known products with a similar content of saturated and trans fatty acids, or a similar solid fat content (SFC) at 20° C.

The structured edible product of this invention presents the advantage of showing a high oil retention capacity, the expected spontaneous separation of oil from the product, at the temperature at which the product is normally consumed, not taking place even in case the edible product takes the form of a relatively soft cream. The product of this invention may be consumed at room temperature or fridge temperatures below room temperature, but preferably above 0° C. or 3° C. This is surprising since the triglyceride part of the composition has a low to very low saturated fatty acid (SAFA) content and/or a low SFC at 20° C. Because of this low SAFA content, the person skilled in the art would never expect it possible to obtain a structured edible product based on a fat with the triglyceride composition of the first claim, without spontaneous oil separation occurring. Much to the surprise of the inventor, the liquid oil remains captured within the matrix of the edible product, without tending to oil out, i.e. separating the liquid oil from the solid fat. Even when contacted with other products that are capable of absorbing oil, oil loss from the edible product of this invention remains negligible. The ensuing advantage is that the edible product of this invention exhibits a high resistance to oil migration even when contacted with other products that are capable of and/or show a tendency to absorbing oil. An example of such a product is a cream which when contacted with a chocolate shell or when deposited on a biscuit, does not loose a significant part of the liquid oil present in it. With creams showing a bad oil retention capacity, this could quickly result in softening and blooming of the chocolate shell and a hardening of the cream that lost part of the liquid oil.

The structured edible product of the present invention is attractive from an economical point of view, as POP fats are abundantly available since their main source is palm oil, and at reasonable cost.

Within the scope of this invention, fat continuous products are understood to designate products in which the continuous phase is formed by the fat. Examples of such fat continuous products are chocolate fillings and spreads. Baked products or French fries are not to be considered as fat continuous products within the scope of this invention, as the continuous phase of these products is not formed by the fat it contains. Within the scope of this invention, "structured product" means a product with a structure which does not spontaneously and visually separate into two or more phases after less than 24 hours of storage at the temperature at which the product is normally consumed. This can be room temperature, but this can also be a lower temperature, for example refrigerator temperature or any other temperature above 0° C.

Oils or fats contained in a filler material, also have to be considered as part of the triglyceride composition and the fat free part of the material is considered as part of the filler material. Within the scope of the present invention the filler material, if present, is an ingredient that is added on purpose to the edible product of the present invention. Thus a product consisting of 100% grinded oilseeds, even in case it forms a paste is considered as a filler material, even though it could be considered an oil continuous product, is not to be considered as an edible product according to the invention as its components have not been combined on purpose.

In the edible product of this invention, the majority of the fatty acids has a chain length between 8 and 18 C-atoms. The remaining part can be fatty acids with a shorter or a longer chain. Shorter chained fatty acids will usually present in case the edible product contains for instance milk fat; longer chained fatty acids are present when the edible product for instance contains groundnut oil.

Hydrogenation of liquid oils or semi-liquid oils is a frequently used technique for producing hard fats. However, hydrogenation increases the amount of saturated fatty acids in the fat composition. In case of partial hydrogenation, trans fatty acids are built, which also give negative health effects. For this reason, hydrogenation has got a rather bad connotation. Although the edible product of the present invention may contain hydrogenated oils or fats, it is preferred to minimise or even to avoid their use. Therefore, the present invention tends to minimise the use of hydrogenated products in the triglyceride composition, and tends to use triglyceride compositions which are substantially free of hydrogenated fat components.

According to a preferred embodiment, the edible product of the present invention contains expressed on the total weight of the product, less than 30 wt. %, preferably less than 25 wt. % of saturated fatty acids. The triglyceride composition preferably contains less than 45 wt. %, preferably less than 40 wt. %, more preferably less than 35 wt. %, most preferably less than 30 wt. % of saturated fatty acids with respect to its total weight. The triglyceride composition preferably contains less than 5 wt. % of trans unsaturated fatty acids, more preferably less than 2 wt. %, and at least 15 wt. %, more preferably at least 20 wt. %, most preferably at least 25 wt. % of POP. The preferred C16/C18 saturated fatty acids ratio of the triglyceride composition is at least 1.5, more preferably at least 2, most preferably at least 4.

In the present invention it was found that the presence of high amounts of SU2 adversely affects the hardness of the edible product. This is contrary to the teaching of EP-A-731.645. In view of this finding the SU2 triglyceride concentration in the glyceride composition and the structured product of this invention is preferably limited. To achieve this, the triglyceride composition of this invention has a SUS/SUU ratio of at least 1.3, preferably at least 2, more preferably at least 2.5, most preferably at least 3, wherein S is a saturated fatty acid having 16-18 carbon atoms and U is an unsaturated fatty acid having 18 carbon atoms or more.

Traditionally, to obtain a fat composition or edible product containing that fat with a harder structure, high melting triglycerides like trisaturated triglycerides (S3) were incorporated into the fat composition or the edible product. These high melting triglycerides can be obtained by full hydrogenation of oils or fats, or by fractionation of natural fats. Although the high melting triglycerides are used because of their structuring properties, they are usually incorporated to a limited extent only, because they are high melting and can cause a waxy mouthfeel. In the present invention it has now surprisingly been found that high levels of S3 triglycerides has an adverse effect on the hardness of the edible product of this invention. Therefore it is preferred to limit the S3 concentration and to use a triglyceride composition with a SUS/S3 ration of at least 15, preferably at least 20, more preferably at least 25, wherein S is a saturated fatty acid having 16-18 carbon atoms and U is an unsaturated fatty acid having at least 18 carbon atoms.

A preferred embodiment of the edible product of this invention contains
   b) between 95 and 100 wt. % of a triglyceride composition
   c) between 0 and 5 wt. % of a filler material
   d) less than 8 wt. % of water and less than 5 wt. % of one or more additives.

Other preferred embodiments of the edible product of this invention contain between 20 and 95 wt. % of a triglyceride composition, preferably between 25 and 60 wt. %, more preferably between 30 and 50 wt. %; and between 5 and 80 wt. % of a filler material, preferably between 75 and 40 wt. %, more preferably between 70 and 50 wt. %.

Edible products according to a first preferred embodiment of this invention consist exclusively or almost exclusively of fat. These products are mostly intermediate products, which are suitable for use in the processing of final products and which can be structured to obtain a hard texture. Because of their high level of unsaturated fatty acids, often additives will be added to these products to improve their oxidation stability.

Although within the scope of this invention, the edible product may be a shortening, the preferred edible product of the present invention is not a shortening. The edible product of the present invention is a structured fat product, which has a harder texture as compared to a plastic shortening. It is remarked that plastic shortenings are well known structured fat products, which may also exclusively consist of fat, but they have a softer texture and a quite weak oil retention capacity, especially in contact with other porous materials. According to "Bailey's Industrial Oil & Fat Products" (Ed. 5-1996 Vol 3 pg 115 & pg 120), a "shortening is a typically 100% fat product". " . . . shortening, margarine and spreads are formulated to possess special physical characteristics. These products appear to be solid yet, when subjected to a shearing force great enough to cause a permanent deformation, all assume the rheological flow characteristics of a viscous liquid. Such solids are referred to as plastic solids. Their plastic nature enables them to spread readily and combine thoroughly with other solids or liquids without cracking, breaking, or liquid oil separating from the crystalline fat." Shortenings find numerous applications in baked goods, where the fat is used to prevent cohesion of gluten strands.

A second preferred embodiment of the edible product of this invention contains
   b) between 20 and 95 wt. % of a triglyceride composition, preferably between 25 and 60 wt. %, more preferably between 30 and 50 wt. %;
   c) between 5 and 80 wt. % of a filler material, preferably between 75 and 40 wt. %, more preferably between 70 and 50 wt. %.

Products according to this second embodiment contain an amount of fat and an amount of filler material. A typical example of a product according to this second embodiment is a confectionery cream containing 30 to 50 wt. % of fat, 30 to 50 wt. % of sugar and optionally other dry ingredients, like whole and/or skimmed milk powder, cocoa powder, etc. Products of this second embodiment are rather final products that can be used as such or can be part of a composed product e.g. a confectionery filling. Those final products mostly have the structure desired by the final consumer.

Edible products of interest to this invention preferably have a limited water content, which is below 8 wt. %, preferably below 5 wt. %, more preferably below 2 wt. % with respect to the total weight of the edible product. Introducing large amounts of water, like in margarines, leads to different food systems, like for instance an oil in water emulsion, where usually additives or selected ingredients and special processing techniques are applied to stabilise the emulsion. The edible product of the present invention therefore is preferably not an emulsion, in particular not a W/O emulsion. W/O emulsions, like margarines, obtain their structure by specific emulsification and solidification techniques and the use of emulsifiers and thickening agents and thus have a structure which differs from the structure of the edible product of the present invention. The product of this invention does not need to be subjected to such techniques to obtain its structure.

Preferably, at least part of the triglycerides present in the structured fat continuous edible product of this invention are in a crystallised form. The crystallised fat has been found to form the basis for the fat-continuous product structure, and to provide a high oil retention capacity. The crystallised triglycerides have been found to provide the structure capable of absorbing and storing oil, or more generally of absorbing fats which are liquid at a given temperature. In the known products the basis of the structure is usually provided by incorporation of an emulsifier or a non-glyceride structuring agent, or by subjecting the product to a processing for example in baking or extrusion. To minimise the risk to the occurrence of a sandy grainy mouthfeel upon eating, the crystal size of more than 90% of the crystallised fat is smaller than 100 μm, preferably smaller than 75 μm, more preferably smaller than 50 μm, most preferably smaller than 25 μm. Larger fat crystals, often are built through recrystallisation upon storage. This phenomenon is well known in the case of margarines, where a change from Beta-prime to Beta crystals, results in a "sandy" product. Larger crystals are also accompanied by a weaker structure of the edible product.

A strong product with a stable structure may in particular be obtained in case at least 50, preferably at least 70, more preferably at least 85 wt. % of the crystallised fat is crystallised in the Beta-form. The Beta-form is the crystal form type V or VI as defined by Wille & Luton.

The product of this invention is characterised by a firm structure, which is built quickly after production, in particular quickly after crystallisation of the solid fat part, with almost no tendency to post-hardening or post-softening. There is thus no need for long storage or storage at low temperature after production of the edible product of this invention, to build a strong structure. The inventors have found that the edible product of this invention is characterised by a hardness which hardly changes upon storage. In particular, the hardness of the edible product after stabilisation at room temperature during one day after production, and after storage for one week after production, differ less than 25%, preferably less than 20%, most preferably less than 10%. This is an advantage over the prior art where special procedures have to be applied to obtain the firm structure.

The present invention therefore also relates to structured, fat continuous edible products which contain, expressed on total product basis,
   a) less than 35 wt. % of saturated fatty acids,
   b) between 20 and 100 wt. % of a triglyceride composition
   c) between 0 and 80 wt % of a filler material
   d) less than 15 wt. % of water
and which show such a DSC melting profile.

The best results in terms of hardness, mouthfeel and minimum risk to the occurrence of waxiness are obtained with glyceride compositions that contain mainly fatty acids with a chain length between 14 and 18 carbon atoms, preferably at least 90 wt. %, more preferably at least 95 wt. %, most preferably at least 97 wt. % with respect to the weight of the glyceride composition. Although glycerides like lauric fats rich in C-12 fatty acids are capable of building a hard structure, they have a high content of saturated fatty acids. On top of that, when combining lauric with non-lauric fats, the fat blend tends to display eutectic effects, meaning a loss in hardness. Therefore it is preferred to minimise their use within the scope of the present invention.

According to the prior art, incorporation of triglycerides containing one or more C22 fatty acids is another way of inducing structure in a fat composition or an edible product. With the present invention it has now been found that the use of C22 fatty acids is to be minimized as they adversely affect the hardness of the edible product of the invention. Therefore, it is preferred to limit the concentration of C22 fatty acids in the edible product of this invention to below 2.5 wt. % with respect to the total weight of the triglyceride composition, preferably to below 1.5 wt. %, more preferably to below 1.0 wt. %, most preferably to below 0.7 wt %. By carefully selecting the nature of the triglycerides present in the structured edible product of the present invention, its hardness could be significantly increased without requiring the presence of triglycerides containing so-called long-chain fatty acids, i.e. fatty acids having more than 20 carbon atoms.

The Solid Fat Content (SFC) of the structured edible product of this invention and of the triglyceride compositions at room temperature is preferably limited. Thereto, preferred edible products contain triglyceride compositions that are characterised by a N20 of ≦40% preferably ≦35% more preferably ≦30%. The inventors have surprisingly found that in spite of this low amount of solid fat, a product with a good structure at room temperature can be obtained. It is also preferred to limit the solid fat content at 35° C., since high values at this temperature indicate poor melting properties in the mouth, creating waxiness. Therefore it is preferred that the N35≦15%, preferably ≦10, more preferably ≦5, most preferably ≦2 wherein N20 and N35 are the solid fat content of the triglyceride part and the SFC is measured according to method IUPAC 2.150a.

It is further preferred that the edible product and triglyceride composition of this invention comprise at least one hard or semi hard fat component and at least one liquid component, the liquid component being at least one liquid oil or a mixture of two or more liquid oils. The at least one hard or semi-hard fat is a fat which is a solid or semi-solid fat at room temperature, preferably with a melting point of at least 25° C. With semi-solid fat is meant a fat that at room temperature contains a visible part of solid fat and a visible part of liquid oil. The at least one liquid oil is an oil which is liquid at room temperature.

Preferably, the triglyceride composition and edible product of this invention are characterised in that the amount of the at least one hard or semi-hard fat with respect to the weight of the triglyceride composition ranges from 10-90 wt. %, preferably from 25-70 wt. %, more preferably from 35-65 wt. % and in that the amount of the at least one liquid oil ranges from 10-90 wt. %, preferably 30-75 wt. %, more preferably 35-65 wt. % with respect to the weight of the triglyceride composition. The amounts of the at least one hard or semi-hard fat and liquid oil may vary, mainly depending on the hardness of the hard or semi-hard fat that is chosen, and also depending on the envisaged hardness of the final edible product.

If a liquid oil is chosen as liquid component or part of the liquid component, then preferably this liquid oil will be a vegetable oil selected from the group of rapeseed oil, corn oil, soy oil, sunflowerseed oil, cotton seed oil, maize oil, olive oil, hazelnut oil, groundnut oil, liquid fractions of palm oil or shea butter, a blend of two or more of the afore mentioned oils and fractions thereof. This also includes varieties of afore mentioned oils, like for instance high oleic sunflower oil. Preferably the liquid oil or the majority of the liquid oil is added to the recipe as an oil component rather than an oil being part of a filler material, like for instance the oil contained in grinded nuts or seeds. The latter oil is only to a limited extend available for being taken up in a network with the hard fat component. This degree will also vary depending on the grinding process of the nuts or the seeds.

As hard or semi-hard fat, a fat will be preferably used that contains at least 50 wt. %, 60 wt. %, more preferably at least 70 wt. % of SUS-triglycerides with respect to the weight of the hard or semi-hard fat, wherein S is a saturated fatty acid having 16-18 carbon atoms and U is an unsaturated fatty acid having 18 carbon atoms or more whereby the SUS-concentration is expressed on the total weight of hard or semi-hard fat. A good structure with strong oil retention capacity is obtained provided a minimum amount of SUS-triglycerides is present. Therefore the hard fat preferably contains the above mentioned minimum amount of SUS-triglycerides with respect to the weight of the hard or semi-hard fat. The inventors have found that a stronger structure could be obtained with higher SUS-contents, even for products having a low content of saturated fatty acids.

Preferred hard or semi-hard fats contain a palm fraction, preferably with an Iodine Value (IV) of less than 45, preferably less than 40, most preferably less than 37. The hardest fats from palm raw materials are obtained by double fractionation of the raw material; this can be dry fractionation or solvent fractionation. The hard or semi-hard fat can also be a combination of palm fractions with other hard fats rich in SUS-triglycerides, like for instance cocoa butter, shea butter, fats from illipe butter, kokum fat, sal fat, allanblackia fat, mowrah butter or mango kernel fat, enzymatically prepared fat or a fraction thereof, or a blend of two or more of the afore mentioned fats or fractions thereof.

The filler material used in the edible product of this invention will usually be a non-glyceride, edible solid material. A common filler material comprises at least one component selected from the group consisting of sugar, flour, starch, skimmed milk powder, whole milk powder, whey powder, cocoa powder, coffee powder, food grade organic and inorganic solid powders or a blend of two or more of these. Mostly the filler material is a powdery product with a mean particle size of smaller than 500 µm, preferably smaller than 250 µm, most preferably smaller than 100 µm. The mean particle size hereby is based on the number of particles and not on their weight. This small particle size facilitates blending with the fat to a homogeneous product, improves the structure of the end product, at a minimum risk to sensing graininess upon eating. However, other fillers considered suitable by the person skilled in the art may be used as well.

The present invention also relates to a structured, fat continuous edible product with an acceptable texture, a good mouthfeel, a good nutritional profile and a structure which is harder structure than could be expected on the basis of the triglyceride composition present in it, in particular on the basis of the saturated and trans fatty acid content. Such an edible product is characterized by a hardness characterized by an R-value of at least 200, preferably at least 400, more preferably at least 550, most preferably at least 700.

A preferred embodiment of the edible structured, fat continuous product of the present invention is characterized by a hardness characterized by an R-value of at least 200, preferably at least 400, more preferably at least 550, most preferably at least 700, wherein the R-value is the hardness relative to the glyceride content and STFA-content of the glyceride composition and is defined as $$R = T/(S \times STFA \times F) \times 10000$$

in which

T is the hardness of the edible product expressed in gram and measured with a texture meter at 20° C. using a metal cylindrical probe of a diameter between 2.5 and 4.5 mm, to a penetration depth of 10 mm. When measurement to such a depth is not possible, the maximum value found during measurement to the maximum attainable penetration depth is taken.

S is the bottom surface of the cylindrical probe expressed in $mm^2$ STFA is the sum of saturated and trans fatty acids of the glyceride composition expressed in wt. % with respect to the total weight of the glyceride composition.

F is the amount of glyceride composition with respect to the total weight of the edible product, expressed in wt. %

In this context, the wording "hardness measured with a texture meter", means the maximal force (expressed in gram) the instrument has to apply, to penetrate with a cylindrical probe of a certain diameter to a certain depth into the product. This method is widely used in food industry. Instruments, using this principle that are suitable for use as texturemeter are for instance the TA-XT2 texture analyzer from Stable Micro Systems (SMS), or the Stevens-LFRA Texture Analyser. Preferably use is made of an SMS texture analyzer equipped with a stainless steel cylindrical probe with a diameter of 3 mm operated at a probe speed of 0.5 mm/sec to a penetration depth of 10 mm. Other probes and measuring conditions have been tested. However, their influence on the final R-values measured were minimal. Texture depends clearly on the fat content of the edible product and it's STFA-level, i.e. its content on saturated and trans fatty acids. Based on the R-value a relative comparison between different products, having different fat contents and STFA-levels, can be done.

The R-value of the edible product of this invention will usually be less than 10000, often less than 6000.

Those edible products will further show the above-described technical features. In these edible products (1) the triglyceride composition preferably has an STFA-content of less than 35 wt. %, preferably less than 30 wt. %, most preferably less than 25 wt. %, STFA-content meaning the sum of saturated and trans fatty acids, (2) and the sum of all saturated and unsaturated fatty acids contained in the glyceride composition having 8 up to and including 18 carbon atoms is at least 90 wt. % with respect to the weight of the glyceride composition, preferably at least 95 wt. %, most preferably at least 97 wt. %, The fat continuous, structured edible product of this invention may take any form considered suitable by the person skilled in the art, for example it may be confectionery compositions, in particular a cream, a coating, a tablet, a filling, a filled chocolate product, a non-emulsified spread, a culinary product, solid fat ingredients for food products, soft cheese, or any other edible product known to the person skilled in the art. This also includes food products which are stored below room temperature and consumed at such temperature, for example between 0 and 10° C., for example products stored in the fridge and consumed at fridge temperature.

The edible product of this invention may be used in the production of further food products such as for example those selected from the group consisting of a filled chocolate product, a biscuit coated with a cream layer wherein the cream layer as such may be further coated with a coating or not, a biscuit having a cream layer sandwiched between two or more biscuits, extruded products with an interior structured filling, baked products with a structured filling, filled or topped confectionery products, filled or topped culinary products or any other food product known to the person skilled in the art.

The present invention also relates to the use of a triglyceride composition for producing the above-described structured, fat continuous edible product. Such a triglyceride composition preferably contains less than 50 wt. %, preferably less than 45 wt. %, more preferably less than 40 wt. %, more preferably less than 35 wt. %, most preferably less than 30 wt. % of saturated fatty acids. The triglyceride composition further preferably contains less than 10, preferably less than 5 wt. % of trans unsaturated fatty acids, more preferably less than 2 wt. %. In addition the C8-18 fatty acid content of the triglyceride composition is preferably at least 90 wt. %. The POP content of the triglyceride composition is preferably at least 10 wt. % with respect to the weight of the triglyceride composition, preferably at least 15, more preferably at least 20, most preferably at least 25 wt. %, wherein P is Palmitic acid and O is oleic acid. The ratio SUS/SUU is preferably at least 1.3, preferably at least 2, more preferably at least 2.5, most preferably at least 3, wherein S is a saturated fatty acid having 16-18 carbon atoms and U is an unsaturated fatty acid having 18 carbon atoms or more. The SUS/S3 ratio of the triglyceride composition of this invention is at least 15, preferably at least 20, more preferably at least 25, wherein S is a saturated fatty acid having 16-18 carbon atoms and U is an unsaturated fatty acid having 18 carbon atoms or more. The C16/C18 saturated fatty acid ratio of the triglyceride composition of this invention is at least 1, preferably at least 1.5, more preferably at least 2, most preferably at least 4. Preferably the triglyceride composition of this invention has an SFC at 20° C. of more than 3% and less than 55%. The present invention therefore also relates to the above-described a triglyceride composition and the use thereof for the production of the above-described structured, fat continuous edible product.

The present invention further relates to the use of such a triglyceride composition for the production of a food product from the group of consisting of confectionery compositions, in particular a cream, a coating, a tablet, a filling, a filled chocolate product, a biscuit coated with a cream layer wherein the cream layer as such may be further coated with a coating or not, a biscuit having a cream layer sandwiched between two or more biscuits, non-emulsified spreads, culinary products, solid fat ingredients for food products, soft cheese, extruded products with an interior structured filling, baked products with a structured filling, food products which are stored below room temperature and consumed at such temperature, for example between 0 and 10° C., fore example products stored in the fridge and consumed at fridge temperature.

These are in fact food products which contain the above-described edible composition and triglyceride composition.

For producing the edible product of the present invention, several processes may suitably be used. However, the process for producing the above-described structured fat continuous edible product preferably comprises the steps of blending 20-100 wt. % of a triglyceride composition 0-80 wt. % of a filler material less than 15 wt. % of water and the step of inducing crystallisation of the triglyceride composition into a stable crystalline form and building of a solid structure. Although the triglyceride composition may be blended with the other ingredients in a partly molten form, it is recommendable that the triglyceride composition is in a completely liquid form when added to the other ingredients. Therefore the hard fat is preferably first molten and blended with the whole amount of liquid oil component or with at least an important amount of the liquid oil, so that the hard fat can be dissolved before being blended with the filler material. Preferably all of the filler material is added at once, since addition of the filler material in a later stage induces lump formation. The step inducing crystallisation of the triglyceride composition into a stable crystalline form can for instance be a cooling method or temperature-time profile whereby the crystallization of the solid fat into a stable crystalline form is favored. Thereby the edible product and triglyceride composition show the technical features described hereabove.

According to a first preferred embodiment of a process for producing the edible product of this invention, the process comprises the steps of blending
(1) between 20 and 100 wt. % with respect to the total weight of the edible product of a triglyceride composition in an at least partly, preferably completely, molten form, with
(2) between 0 and 80 wt. % of a filler material
(3) and between 0 and 10 wt. % with respect to the weight of the edible product of water, followed by a second step which involves cooling of the blend to a temperature between 17 and 35° C., preferably between 20 and 30° C., most preferably between 22 and 28° C., after which mixing and homogenizing is stopped, followed by a hardening step during which the product is permitted to build a structure upon further cooling and stabilisation.

Cooling in the second step is preferably carried out with simultaneous mixing and homogenizing of the blend as this helps to build the final structure more rapidly. Final cooling in the hardening step after mixing, may be carried out with or without forced cooling, preferably under gentle cooling conditions. Compared to the third preferred process disclosed below, the product may need more time to acquire its final hardness, but it will give a similar product in terms of hardness and nice melting properties in the mouth.

It is further preferred to leave the structured, fat continuous edible product after a solid structure is obtained upon crystallization of at least part of the triglyceride component, for stabilization of the crystallized fat, with the purpose of increasing the hardness of the edible product.

According to a second preferred embodiment of a process of this invention, a tempering step is used whereby the above described mixture with the triglyceride composition in the molten state is first cooled, after which the edible product is re-heated to melt unstable crystals, followed by a second cooling step. In this case, preferably use is made of a tempering machine.

According to a third preferred embodiment of a process of this invention, an amount of a tempering additive is added to the edible product. The tempering additive contains a minimum working amount of crystallized fat in the Beta-form. Examples of such tempering additives are described in EP 294 974 and EP 276 548. The amount of tempering additive used will usually be less than 10 wt. %, preferably less than 5 wt. %, more preferably less than 2 wt. %, most preferably less than 1 wt. %, expressed on total edible product. According to that process, the edible product, with its glyceride part or the majority of it in the molten form, is first homogenized, to blend all ingredients. Thereafter the blend is cooled to a temperature below the melting temperature of the crystallized fat in the Beta-form, present in the tempering additive. The tempering additive is mixed into the mass. The inventors have found that quickly after that, the product starts solidifying. After addition, the product may be further cooled by a forced cooling step, or it can also be further left to cool to room temperature.

When applying one of the three previous processes, the time needed to build the edible products' desired hardness will mostly be less than 12 hours, often less than 6, most preferably less than 2 hours from the start of the hardening step.

A fourth preferred embodiment of a process for producing the structured, fat continuous edible product of this invention, has been found to be particularly suitable for producing edible products containing a high amount of fat, preferably 70 to 100 wt. % with respect to the weight of the edible product. According to that process a completely or almost completely molten glyceride blend, is mixed with maximum 30 wt. % with respect to the weight of the edible product of at least one filler material, while simultaneously cooling and agitation. Upon cooling the high melting glycerides start to crystallize, causing an increase of the viscosity. The inventors have observed that when agitation is stopped, the material builds soon a solid or semi-solid texture, meaning that it looses its liquid, free flowing state. Agitation speed should be sufficiently high in order to minimise the risk to formation of large glyceride crystals or crystal agglomerates that could cause a grainy texture and mouthfeel. In this process, the product is preferably cooled to a temperature between 12 and 28° C., preferably between 15 and 25° C., most preferably between 17 and 23° C. with simultaneous agitation. With this fourth embodiment of the process it is possible to obtain a product that forms a solid texture after less than 60 minutes, preferably less than 30, most preferably less than 15 minutes after stopping the agitation.

The edible product obtained with the preferred embodiments of the process for producing the edible product of this invention is already obtaining structure upon partial crystallisation of the triglyceride composition in the blend. Thereby at least part of the filler material, but preferably all the filler material is present when blending.

In the preparation of hard, structured edible products, many processes are known that involve a heating step like cooking, baking, roasting, extrusion upon which the edible product obtains a hard structure. The edible products according to the present invention however, obtain a solid structure upon crystallization of at least part of the glyceride component. This happens upon cooling from the molten state or/and by use of a tempering additive. Crystallisation can possibly be followed by a stabilization of the crystallized fat, leading to a further increase of the hardness of the edible product.

The invention is further illustrated in the examples and comparative examples given below.

EXAMPLES

Example 1

Confectionery creams were made according to the following recipe:

TABLE 1

| | |
|---|---|
| Low SAFA fat I | 40% |
| Sugar | 30% |
| Skimmed milk powder | 30% |
| Lecithin | 0.1% |

The fats used for these creams were blends of high oleic sunflower oil and a palm mid fraction with IV 34, in different ratios. Table 2 gives an overview of the characteristics of the blends that were used. A comparative blend Nr. 5 with 40 wt.

% of SAFA, made by blending standard palm oil with high oleic sunflower oil, was also evaluated.

TABLE 2

|  | Blend 1 | Blend 2 | Blend 3 | Blend 4 | Comp Blend 5 |
|---|---|---|---|---|---|
| SFC 20° C. | 5.5 | 13.6 | 24.7 | 37.2 | 14.1 |
| SFC 35° C. | 0 | 0 | 0 | 0 | 3.3 |
| C-16 | 24.1 | 28.8 | 33.6 | 38.3 | 33.7 |
| C-18 | 4.0 | 4.3 | 4.6 | 4.8 | 4.1 |
| C-16/C-18 | 6.0 | 6.7 | 7.4 | 7.9 | 8.1 |
| C-22 | 0 | 0 | 0 | 0 | 0 |
| POP | 26.4 | 32.4 | 38.4 | 44.4 | 21.3 |
| SUS | 32.5 | 39.8 | 47.0 | 54.3 | 32.8 |
| SUU | 12.2 | 11.1 | 10.0 | 8.9 | 28.9 |
| S3 | 1.3 | 1.4 | 1.5 | 1.6 | 4.7 |
| SUS/SUU | 2.7 | 3.6 | 4.7 | 6.1 | 1.1 |
| SUS/S3 | 24.6 | 28.0 | 30.9 | 33.5 | 6.9 |
| SAFA | 30 | 35 | 40 | 45 | 40 |
| TFA | 0.1 | 0.1 | 0.1 | 0.1 | 0.1 |
| STFA | 30.1 | 35.1 | 40.1 | 45.1 | 40.1 |

SFC is the solid fat content measured according to IUPAC method 2.150(a).
SAFA = sum of saturated fatty acids
TFA = sum of trans fatty acids
C16 = Saturated Fatty Acid with 16 carbon atoms
C18 = Saturated Fatty Acid with 18 carbon atoms
P = Palmitic Acid
O = Oleic Acid
S = Saturated Fatty Acid having 16-18 carbon atoms
U = Unsaturated Fatty Acid having 16-18 carbon atoms The cream was made by mixing the ingredients, refining the blend on a 3-roll refiner and conching at 55° C. The cream was cooled to 26° C. and 0.2 wt. % with respect to the weight of the composition of Chocoseed A was added. Chocoseed A is a product of Fuji Oil which contains a minimum working amount of SUS-triglyceride, crystallised in the Beta-form. The filling and the Chocoseed were mixed well. The cream was transferred to sample cups and then left at room temperature to cool further and stored at that temperature (20° C.+/−1° C.). Texture of the filling was measured after 1 day at room temperature with an SMS-texture meter, using probe of 3 mm diameter, speed 0.5 mm/sec, depth 10 mm. The results obtained are listed in table 3.

TABLE 3

| Blend | Texture (g) | R |
|---|---|---|
| 1 | 567 | 666.6 |
| 2 | 777 | 783.3 |
| 3 | 1902 | 1678.4 |
| 4 | 2134 | 1674.3 |
| 5 (comp) | 126 | 111.2 |

From this table it can be concluded that the creams all showed a hardness that is higher than could be expected based on the low SAFA-content. The creams were tasted, and all of them, except the blend with palm oil, give a good melting sensation in the mouth and no graininess.

The invention claimed is:

1. A structured, fat continuous edible product, wherein the edible product comprises, expressed on total product basis,
   a) less than 35 wt. % of saturated fatty acids,
   b) between 20 and 100 wt. % of a triglyceride composition,
   c) between 0 and 80 wt. % of a filler material,
   d) less than 15 wt. % of water, and
wherein the triglyceride composition comprises, with respect to the weight of the triglyceride composition,
   e) less than 50 wt. % of saturated fatty acids,
   f) less than 2 wt. % of trans unsaturated fatty acids,
   g) at least 10 wt. % of POP triglycerides, wherein P is a Palmitic fatty acid and O is Oleic acid,
   h) a SUS/SUU ratio of at least 1.3:1, wherein S is a saturated fatty acid comprising 16-18 carbon atoms and U is an unsaturated fatty acid having 18 carbon atoms or more,
   i) a SUS/S3 ratio of at least 15:1, wherein S is a saturated fatty acid comprising 16-18 carbon atoms and U is an unsaturated fatty acid comprising 18 carbon atoms or more,
   j) at least 90 wt. % of C8-18 fatty acids,
   k) a ratio C16/C18 saturated fatty acids of at least 1, and
   l) an SFC at 20° C. of 3-55%.

2. The structured, fat continuous edible product according to claim 1, wherein the product contains less than 30 wt. % of saturated fatty acids, and wherein the triglyceride composition comprises, with respect to the weight of the triglyceride composition,
   less than 45 wt. % of saturated fatty acids,
   at least 15 wt. % of POP triglycerides, wherein P is a Palmitic fatty acid and O is Oleic acid,
   a SUS/SUU ratio of at least 2:1, wherein S is a saturated fatty acid comprising 16-18 carbon atoms and U is an unsaturated fatty acid comprising 18 carbon atoms or more,
   a SUS/S3 ratio of at least 20:1, wherein S is a saturated fatty acid comprising 16-18 carbon atoms and U is an unsaturated fatty acid comprising 18 carbon atoms or more, and
   a C16/C18 saturated fatty acids ratio of at least 1.5:1.

3. The edible product according to claim 2, wherein the triglyceride composition contains less than 40 wt. % of saturated fatty acids.

4. The edible product according to claim 3, wherein the triglyceride composition contains less than 35 wt. % of saturated fatty acids.

5. The edible product according to claim 4 wherein the triglyceride composition contains less than 30 wt. % of saturated fatty acids.

6. The edible product according to claim 2, wherein the SUS/SUU ratio is at least 2.5:1.

7. The edible product according to claim 6, wherein the SUS/SUU ratio is at least 3:1.

8. The edible product according to claim 2, wherein the SUS/S3 ratio is at least 25:1.

9. The edible product according to claim 2, wherein the C16/C18 saturated fatty acid ratio is at least 2:1.

10. The edible product according to claim 9, wherein the C16/C18 saturated fatty acid ratio is at least 4:1.

11. The structured, fat continuous edible product according to claim 1, wherein the edible product comprises:
    between 95 and 100 wt. % of the triglyceride composition,
    between 0 and 5 wt. % of the filler material,
    less than 8 wt. % of water, and
    less than 5 wt. % of one or more additives.

12. The structured, fat continuous edible product according to claim 1, wherein the product is not a shortening.

13. The structured, fat continuous edible product according to claim 1, wherein the edible product comprises:
    between 20 and 95 wt. % of the triglyceride composition, and
    between 5 and 80 wt. % of the filler material.

14. The edible product according to claim 13, comprising 25-60 wt. % of the triglyceride composition.

15. The edible product according to claim 14, comprising 30-50 wt. % of the triglyceride composition.

16. The edible product according to claim 13, comprising 75-40 wt. % of filler material.

17. The edible product according to claim 16, comprising 70-50 wt. % of filler material.

18. The structured, fat continuous edible product according to claim 1, wherein the food product comprises less than 5 wt. % of water with respect to the total weight of the food product.

19. The edible product according to claim 18, comprising less than 2 wt. % of water.

20. The structured, fat continuous edible product according to claim 1, wherein the product is not an emulsion.

21. The edible product according to claim 20, which is not a W/O emulsion.

22. The structured, fat continuous edible product as claimed in claim 1, wherein at least part of the triglyceride composition is in a crystallised form for retaining the oil component of the product.

23. The structured, fat continuous edible product as claimed in claim 22, wherein at least 50 wt. % of the crystallised triglycerides are crystallised in the Beta-form.

24. The edible product according to claim 23, wherein at least 85 wt. % of the crystallised triglycerides are crystallised in the Beta-form.

25. The structured, fat continuous edible product as claimed in claim 1, wherein the hardness of the product after storage at room temperature for 1 day following production, and the hardness of the product after storage at room temperature for 1 week following production, differs by less than 25%.

26. The edible product according to claim 25, wherein said hardnesses differ by less than 10%.

27. The structured, fat continuous edible product as claimed in claim 1, wherein the triglyceride composition comprises at least 90 wt. % with respect to the weight of the triglyceride composition, of saturated and unsaturated fatty acids with 14-18 carbon atoms.

28. The edible product according to claim 27, wherein the triglyceride composition comprises at least 95 wt. % saturated and unsaturated fatty acids comprising 14-18 carbon atoms.

29. The structured, fat continuous edible product as claimed in claim 1, wherein the triglyceride composition comprises less than 2.5 wt. % of C22 fatty acids.

30. The edible product according to claim 29, wherein the triglyceride composition contains less than 1.0 wt. % C22 fatty acids.

31. The structured, fat continuous edible product as claimed in claim 1, wherein the triglyceride composition has a N20 of ≦40% and a N35 of ≦15%, wherein N20 and N35 are the solid fat content of the triglyceride part as measured according to IUPAC 2.150a.

32. The edible product according to claim 31, wherein the triglyceride composition has a N20 of ≦35%.

33. The edible product according to claim 32 wherein the triglyceride composition has a N20 of ≦30%.

34. The edible product according to claim 31 wherein the triglyceride composition has a N35 of ≦10%.

35. The edible product according to claim 34 wherein the triglyceride composition has a N35 of ≦5%.

36. The edible product according to claim 35 wherein the triglyceride composition has a N35 of ≦2%.

37. The structured, fat continuous edible product as claimed in claim 1, wherein the triglyceride composition comprises:

at least one component selected from the group consisting of a hard and a semi-hard fat, wherein the hard fat is solid at room temperature and the semi-hard fat is semi-solid at room temperature, and at least one component selected from the group consisting of a liquid oil and blends of two or more liquid oils, wherein the liquid oil and oil blends are liquid at room temperature.

38. The structured, fat continuous edible product as claimed in claim 37, wherein the amount of the at least one component selected from the group consisting of a hard and a semi-hard fat comprises 10-90 wt. % of the weight of the triglyceride composition, and the amount of the at least one component selected from the group consisting of a liquid oil and blends of two or more liquid oils comprises the remainder of the weight of the triglyceride composition.

39. The edible product according to claim 38 wherein the amount of the at least one component selected from the group consisting of a hard and a semi-hard fat comprises 25-70% of the weight of the triglyceride composition.

40. The edible product according to claim 39 wherein the amount of the at least one component selected from the group consisting of a hard and a semi-hard fat comprises 35-65% of the weight of the triglyceride composition.

41. The edible product according to claim 38 wherein the amount of the at least one component selected from the group consisting of a liquid oil and blends of at least two liquid oils comprises 30-75% of the weight of the triglyceride composition.

42. The edible product according to claim 41 wherein the amount of the at least one component selected from the group consisting of a liquid oil and blends of at least two liquid oils comprises 35-65% of the weight of the triglyceride composition.

43. The structured, fat continuous edible product as claimed in claim 37, wherein the at least one component selected from the group consisting of a liquid oil and blends of two or more liquid oils comprises at least one vegetable oil selected from rapeseed oil, corn oil, soy oil, sunflower seed oil, cotton seed oil, maize oil, olive oil, hazelnut oil, groundnut oil, liquid fractions of palm oil or shea butter, a fraction of one of these oils, and blends of at least two of the aforementioned oils and fractions thereof.

44. The structured, fat continuous edible product as claimed in claim 37, wherein the at least one component selected from the group consisting of a hard and a semi-hard fat comprises at least 50 wt. % of SUS-triglycerides with respect to the weight of the hard or semi-hard fat, wherein S is a saturated fatty acid having 16-18 carbon atoms and U is an unsaturated fatty acid having 18 carbon atoms or more.

45. The edible product according to claim 44 wherein the at least one component selected from the group consisting of a hard and a semi-hard fat comprises at least 60 wt. % SUS-triglycerides.

46. The edible product according to claim 45 wherein the at least one component selected from the group consisting of a hard and a semi-hard fat comprises at least 70 wt. % SUS-triglycerides.

47. The structured, fat continuous edible product as claimed in claim 37, characterised in that the component selected from the group consisting of a hard and a semi-hard fat comprises a palm fraction.

48. The edible product according to claim 47 wherein the palm fraction has an IV of less than 45.

49. The edible product according to claim 48 wherein the palm fraction has an IV of less than 40.

50. The edible product according to claim 49 wherein the palm fraction has an IV of less than 37.

51. The product as claimed in claim 1, wherein the triglyceride composition is substantially free of hydrogenated fat components.

52. The structured, fat continuous edible product as claimed in claim 1, wherein the filler material comprises at least one component selected from the group consisting of sugar, flour, starch, skimmed milk powder, whole milk powder, whey powder, cocoa powder, coffee powder, food grade organic solid powders, food grade inorganic solid powders and blends of two or more of these materials.

53. The structured, fat continuous edible product as claimed in claim 1, wherein the filler material has a mean particle size of smaller than 500 μm.

54. The edible product according to claim 53 wherein the filler material has a mean particle size of smaller than 100 μm.

55. The structured, fat continuous edible product as claimed in claim 1, wherein the hardness of the edible product is characterized by an R-value of at least 200 and wherein the R-value is defined as:

$$R = T/(S \times STFA \times F) \times 10,000$$

in which:
T is the hardness of the food product, expressed in grams and measured to a penetration depth of 10 mm at 20° C. using a texture meter with a 2.5-4.5 mm diameter cylindrical probe,
S is the surface area of the probe penetration tip expressed in $mm^2$,
STFA is the sum of saturated and trans fatty acids of the triglyceride composition expressed in wt. % with respect to the total weight of the triglyceride composition, and
F is the wt. %. of the triglyceride composition with respect to the total weight of the food product.

56. The edible product according to claim 55 wherein the hardness of the edible product is characterized by an R-value of at least 400.

57. The edible product according to claim 56 wherein the hardness of the edible product is characterized by an R-value of at least 550.

58. The edible product according to claim 57 wherein the hardness of the edible product is characterized by an R-value of at least 700.

59. The structured, fat continuous edible product as claimed in claim 1, wherein the edible product is selected from the group consisting of: a cream, a coating, a tablet, a filling, a filled chocolate product, a non-emulsified spread, a culinary product, a solid fat ingredient for a food product, a soft cheese, and a product with a normal storage temperature below room temperature.

60. A food product containing the structured fat continuous edible product as claimed in claim 1, wherein the food product is selected from the group consisting of a filled chocolate product, a biscuit coated with a cream layer wherein the cream layer as such may be further coated with a coating or not, a biscuit having a cream layer sandwiched between at least two biscuits, an extruded product with an interior structured filling, a baked product with a structured filling, a filled or topped confectionery product, and a filled or topped culinary product.

61. A process for the production of the structured, fat continuous edible product as claimed in claim 1, comprising the incorporation of a triglyceride composition into said edible product, and wherein the triglyceride composition comprises:
less than 50 wt. % of saturated fatty acids,
less than 2 wt. % of trans unsaturated fatty acids,
at least 90 wt. % of C8-18 fatty acids,
at least 10 wt. % of POP, wherein P is palmitic acid and O is oleic acid,
a SUS/SUU ratio of at least 1.3:1, wherein S is a saturated fatty acid comprising 16-18 carbon atoms and U is an unsaturated fatty acid comprising 18 carbon atoms or more,
a SUS/S3 ratio of at least 15:1 wherein S is a saturated fatty acid comprising 16-18 carbon atoms and U is an unsaturated fatty acid comprising 18 carbon atoms or more,
a C16/C18 saturated fatty acid ratio of at least 1:1,
and wherein the triglyceride composition has an SFC at 20° C. of 3-55%.

62. The process according to claim 61 wherein the structured, fat continuous edible product is a food product selected from the group consisting of: a cream, a coating, a tablet, a filling, a filled chocolate product, a biscuit coated with a cream layer wherein the cream layer as such may be further coated with a coating or not, a biscuit having a cream layer sandwiched between at least two biscuits, a non-emulsified spread, a culinary product, a solid fat ingredient for a food product, a soft cheese, an extruded product with an interior structured filling, a baked product with a structured filling, and food products which are stored below room temperature and consumed at such temperature.

63. The method according to claim 61 wherein the triglyceride composition contains less than 45 wt. % saturated fatty acids.

64. The method according to claim 63 wherein the triglyceride composition contains less than 40 wt. % saturated fatty acids.

65. The method according to claim 64 wherein the triglyceride composition contains less than 35 wt. % saturated fatty acids.

66. The method according to claim 65 wherein the triglyceride composition contains less than 30 wt. % saturated fatty acids.

67. The method according to claim 61 wherein the triglyceride composition contains at least 15 wt. % POP.

68. The method according to claim 67 wherein the triglyceride composition contains at least 20 wt. % POP.

69. The method according to claim 68 wherein the triglyceride composition contains at least 25 wt. % POP.

70. The method according to claim 61 wherein the triglyceride composition has a SUS/SUU ratio of at least 2:1.

71. The method according to claim 70 wherein the triglyceride composition has a SUS/SUU ratio of at least 2.5:1.

72. The method according to claim 71 wherein the triglyceride composition has a SUS/SUU ratio of at least 3:1.

73. The method according to claim 61 wherein the triglyceride composition has a SUS/S3 ratio of at least 20:1.

74. The method according to claim 73 wherein the triglyceride composition has a SUS/S3 ratio of at least 25:1.

75. The method according to claim 61 wherein the triglyceride composition has a C16/C18 saturated fatty acids ratio of at least 1.5:1.

76. The method according to claim 75 wherein the triglyceride composition has a C16/C18 saturated fatty acids ratio of at least 2:1.

77. The method according to claim 76 wherein the triglyceride composition has a C16/C18 saturated fatty acids ratio of at least 4:1.

78. A process for producing the structured, fat continuous edible product as claimed in claim 1, wherein the process comprises the steps of:

a) blending 20-100 wt. % of a triglyceride composition in an at least partly molten form with 0-80 wt. % of a filler material and <15 wt. % of water; and
b) inducing crystallisation of the triglyceride composition into a stable crystalline form with a solid structure.

79. The process as claimed in claim 78, further comprising the steps of blending 20-100 wt. % of the triglyceride composition in an at least partly molten form with 0-80 wt. % of the filler material and 0-10 wt. % of water, followed by cooling the thus obtained blend to a temperature between 17 and 35° C., followed by allowing the food product to harden into a solid structure.

80. The process according to claim 79 wherein the triglyceride composition is blended in a completely molten form.

81. The process according to claim 79 wherein the blend is cooled to a temperature between 20 and 30° C.

82. The process according to claim 81 wherein the blend is cooled to a temperature between 22 and 28° C.

83. The process as claimed in claim 78, further comprising a tempering step whereby the mixture comprising the at least partly molten triglyceride composition is subjected to a first cooling step, followed by re-heating the composition to melt unstable crystals, followed by a second cooling step.

84. The process as claimed in claim 78, wherein less than 10 wt. % is added of a tempering additive comprising a minimum working amount of crystallized fat in the Beta-form.

85. The process according to claim 84 wherein less than 5 wt. % is added of the tempering additive.

86. The process according to claim 85 wherein less than 1 wt. % is added of the tempering additive.

87. The process as claimed in claim 78, wherein the at least partly molten triglyceride composition is blended with a maximum 30 wt. % of filler material, while simultaneously cooling and agitating said mixture at an agitation speed sufficient to inhibit the formation of large glyceride crystals or crystal agglomerates.

88. The process as claimed in claim 87, wherein the composition is cooled to a temperature between 12 and 28° C. with simultaneous agitation.

89. The process according to claim 88 wherein the composition is cooled to a temperature between 15 and 25° C.

90. The process according to claim 89 wherein the composition is cooled to a temperature between 17 and 23° C.

91. The process as claimed in claim 78, further comprising allowing the crystallized triglyceride composition to stabilize after crystallization.

92. The process as claimed in claim 91, wherein the triglyceride composition is crystallized and stabilized within 12 hours after blending is completed.

93. The process according to claim 92 wherein the product is left for less than 6 hours from the start of the hardening step, to form a solid texture after blending has been accomplished.

* * * * *